US012741742B2

(12) United States Patent
Ralph et al.

(10) Patent No.: US 12,741,742 B2
(45) Date of Patent: Sep. 22, 2026

(54) LATCH ASSEMBLY WITH SLIDING LATCH AND ROTATING CATCH

(71) Applicant: B/E Aerospace, Inc., Winston-Salem, NC (US)

(72) Inventors: Neil M. Ralph, Winston-Salem, NC (US); Ryan J. Suhre, Winston-Salem, NC (US); Bradley E. Burgess, Pfafftown, NC (US); Robert D. Wilkey, Atlanta, GA (US); Thomas W. Cahoon, Chamblee, GA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 206 days.

(21) Appl. No.: 18/671,544

(22) Filed: May 22, 2024

(65) Prior Publication Data

US 2025/0361016 A1 Nov. 27, 2025

(51) Int. Cl.

| | |
|---|---|
| ***B60N 3/00*** | (2006.01) |
| ***A47C 7/62*** | (2006.01) |
| ***A47C 7/68*** | (2006.01) |
| ***A47C 7/70*** | (2006.01) |
| ***B64D 11/00*** | (2006.01) |
| ***B64D 11/06*** | (2006.01) |

(52) U.S. Cl.

CPC .......... *B64D 11/0638* (2014.12); *B60N 3/004* (2013.01); *A47C 7/68* (2013.01); *A47C 7/70* (2013.01)

(58) Field of Classification Search

CPC .. A47C 7/68; A47C 7/70; B60N 3/004; B64D 11/0638

USPC .................................................. 297/146, 163

See application file for complete search history.

(56) References Cited

U.S. PATENT DOCUMENTS

| | | | | |
|---|---|---|---|---|
| 6,619,733 | B2 * | 9/2003 | Pearson | A47C 7/68 297/391 |
| 6,814,404 | B2 * | 11/2004 | Jensen | B64D 11/0638 297/146 |
| 8,702,163 | B2 | 4/2014 | Westerink et al. | |
| 8,881,659 | B2 * | 11/2014 | Ackeret | B60N 3/004 108/44 X |
| 9,663,978 | B2 | 5/2017 | Saravia Terricabras et al. | |
| 10,384,581 | B2 | 8/2019 | Preisler et al. | |
| 10,556,688 | B2 | 2/2020 | Bhat et al. | |
| 10,696,407 | B2 | 6/2020 | Murray et al. | |
| 11,186,372 | B2 * | 11/2021 | Drenzeck | B64D 11/0636 |
| 11,834,184 | B2 * | 12/2023 | Dowty | B60N 3/004 |
| 12,240,606 | B2 * | 3/2025 | Lalli | B60N 3/004 |
| 2014/0159441 | A1 | 6/2014 | Philipzik et al. | |

(Continued)

*Primary Examiner* — Rodney B White

(74) *Attorney, Agent, or Firm* — Suiter Swantz IP

(57) ABSTRACT

A latch assembly for securing a passenger seat tray table including a spring-loaded sliding latch and a spring-loaded rotating catch. The spring-loaded latch interacts with the spring-loaded catch such that, when the spring-loaded latch is closed, the tab engages the spring-loaded catch to prevent the spring-loaded catch from pivoting open. The spring-loaded catch interacts with the spring-loaded latch such that, when the spring-loaded catch is open, the tab engages the spring-loaded catch to prevent the spring-loaded latch from sliding closed. The latch assembly operates by push-to-close and the latch resets automatically when the tray table is secured. The latch assembly may be a line replaceable unit, part of a tray table assembly, and part of an aircraft passenger seat assembly.

20 Claims, 8 Drawing Sheets

(56) References Cited

U.S. PATENT DOCUMENTS

2015/0028635 A1 * 1/2015 Evels .................... B60N 3/004
297/163
2025/0361015 A1 * 11/2025 Ralph ................ B64D 11/0638

* cited by examiner

LATCH ASSEMBLY WITH SLIDING LATCH AND ROTATING CATCH

TECHNICAL FIELD AND BACKGROUND

The present disclosure relates generally to a latch assembly for a passenger seat tray table, and more particularly, to a latch assembly including a sliding latch for interacting with a rotating catch for securing a tray table.

Tray tables for passenger seats are well known. In aircraft, and particularly in economy seating classes, tray tables stow against the back of a passenger seat and deploy to a horizontal use position during flight. Passenger seats are further equipped with latches for securing the tray table during normal operation as well as during a crash event.

Traditional latches include rotating toggles. In use, the toggle is rotated vertically to retain the tray table, and rotated horizontally to release the tray table. Rotating toggles are not only disadvantageous for requiring two-handed operation (i.e., one to handle the tray table and the other to rotate the toggle), but also present a head strike danger, have protruding surfaces to catch on during ingress and egress, and are unsightly for the backrest aesthetics.

Therefore, what is needed is a latch solution for securing a tray table that overcomes the disadvantages of traditional latches.

BRIEF SUMMARY

According to one aspect, the inventive concepts according to the present disclosure are directed to a latch assembly for securing a passenger seat tray table. The latch assembly includes a latch subassembly including a first mounting block, a spring-loaded latch slidably mounted to the first mounting block, and a tab mounted to the latch. The latch assembly further includes a catch subassembly including a second mounting block, and a spring-loaded catch pivotally mounted to the second mounting block. In use, the spring-loaded latch interacts with the spring-loaded catch such that, when the spring-loaded latch is closed, the tab engages the spring-loaded catch to prevent the spring-loaded catch from pivoting open. Also in use, the spring-loaded catch interacts with the spring-loaded latch such that, when the spring-loaded catch is open, the tab engages the spring-loaded catch to prevent the spring-loaded latch from sliding closed.

In some embodiments, the tab engages a top of the spring-loaded catch to prevent the spring-loaded catch from rotating open, and the tab engages a side of the spring-loaded catch to prevent the spring-loaded latch from sliding closed.

In some embodiments, the spring-loaded latch is configured to slide horizontally and the spring-loaded catch is configured to pivot about a horizontal axis.

In some embodiments, the catch subassembly further comprises a bezel, and the second mounting block is mounted in the bezel.

In some embodiments, the latch subassembly further includes a tension spring for biasing the spring-loaded latch toward closed, and the catch subassembly further includes a torsion spring for biasing the spring-loaded catch toward open.

In some embodiments, the spring-loaded catch defines an interior space configured to receive and engage a tray table on at least two sides of the tray table.

In some embodiments, the first mounting block and the second mounting block are attached or integrally formed.

According to another aspect, the inventive concepts according to the present disclosure are directed to a tray table assembly for a passenger seat. In embodiments, the assembly includes a tray table mountable to the passenger seat, and a latch assembly mountable to the passenger seat for securing the tray table in a stowed position. The latch assembly includes a latch subassembly including a first mounting block, a spring-loaded latch slidably mounted to the first mounting block, and a tab mounted to the latch. The latch subassembly further includes a catch subassembly including a second mounting block, and a spring-loaded catch pivotally mounted to the second mounting block. In use when the latch assembly is closed, the spring-loaded latch interacts with the spring-loaded catch such that the tab engages the spring-loaded catch to prevent the spring-loaded catch from pivoting open. In use when the latch assembly is open, the spring-loaded catch interacts with the spring-loaded latch such that the tab engages the spring-loaded catch to prevent the spring-loaded latch from sliding closed.

In some embodiments, the tab engages a top of the spring-loaded catch to prevent the spring-loaded catch from rotating open, and the tab engages a side of the spring-loaded catch to prevent the spring-loaded latch from sliding closed.

In some embodiments, sliding the spring-loaded latch open causes, in sequential order, the tab to disengage the spring-loaded catch, the spring-loaded catch to pivot open, and the tray table to release from the catch, and stowing the tray table causes, in sequential order, the tray table to engage in the spring-loaded catch, the spring-loaded catch to rotate closed, and the spring-loaded latch to rotate closed and into engagement with the spring-loaded catch.

According to a further aspect, the inventive concepts according to the present disclosure are directed to an aircraft passenger seat assembly. In embodiments, the assembly includes a passenger seat including a backrest, a tray table moveable between a stowed position against a back of the backrest and a deployed position apart from the back of the backrest, and a latch assembly mounted to the back of the backrest above the tray table. The latch assembly includes a latch subassembly and a catch subassembly according to the above embodiments.

In some embodiments, the spring-loaded catch defines an interior space configured to receive and engage the tray table on at least two sides of the tray table.

In some embodiments, an exterior profile of a captured edge of the tray table matches an interior profile of the spring-loaded catch.

BRIEF DESCRIPTION OF THE DRAWINGS

Implementations of the inventive concepts disclosed herein may be better understood when consideration is given to the following detailed description thereof. Such description refers to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
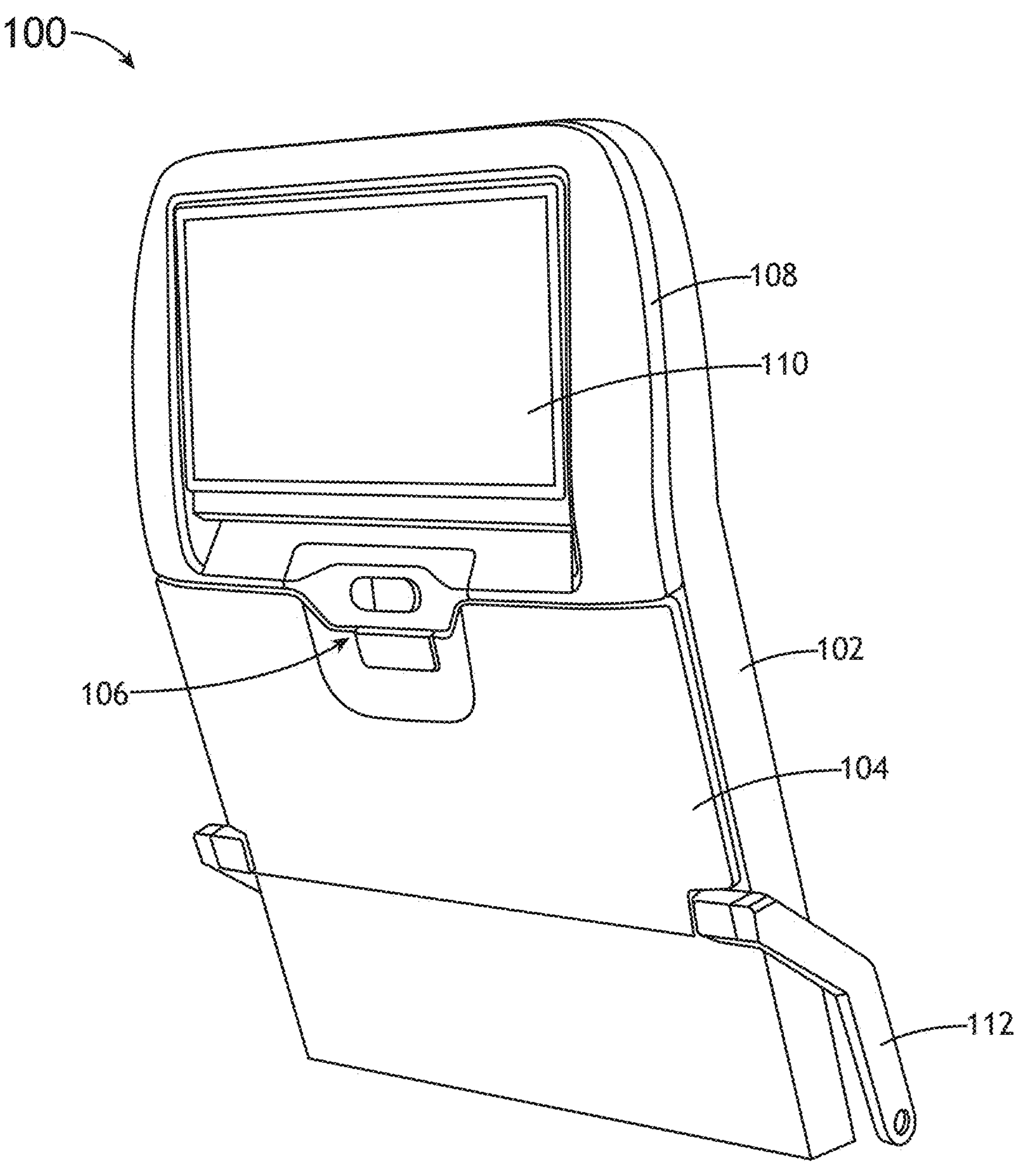
FIG. 1 is a perspective view of a passenger seat assembly including a latch assembly for securing a tray table, in accordance with example embodiments of this disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a latch assembly for securing a passenger seat tray table, a tray table assembly for mounting to a passenger seat, and a passenger seat assembly. The latch assembly generally includes a spring-loaded latch for interacting with a spring-loaded catch. In use, when the spring-loaded latch is closed, a feature of the spring-loaded latch interacts with the spring-loaded catch to prevent the spring-loaded catch from pivoting open. In use, when the spring-loaded catch is open, the spring-loaded catch interacts with the feature to prevent the spring-loaded latch from sliding closed. The feature acts differently when the latch assembly is open as compared to when the latch assembly is closed such that the latch assembly remains open to receive a stowing tray table and closes automatically and resets by way of the stowing action of the tray table. In embodiments, the latch assembly automatically resets and operates by a push-to-close action.

In a particular conceived example, the passenger seat is an economy class aircraft passenger seat including a backrest, and the tray table is mounted for stowing against a back of the backrest and deploys to a position apart from the back of the backrest. In some embodiments, the tray table is substantially upright when stowed and substantially horizontal when deployed. In some embodiments, the tray table may be mounted directly to the backrest. In other embodiments, the tray table my be mounted to support arms further mounted to the seat frame. In an aircraft application, the tray table may be stowed during taxi, takeoff, and landing (TTOL) and deployed for use during flight. The aircraft passenger seat may be a single seat or part of a seat row wherein each tray table serves a passenger seated in the next single seat or seat row. Advantages of the assemblies disclosed herein include, but are not limited to, positive lock of the catch, one-handed operation, auto latching, auto reset, action to open is in a different direction compared to direction of head impact, no to minimal protruding surfaces, and modern styling.

FIG. 1 illustrates an exemplary embodiment of a passenger seat assembly 100 according to the present disclosure. The passenger seat assembly 100 generally includes a backrest 102, a tray table 104, and a latch assembly 106 for securing the tray table 104. Additional passenger seat components not shown are understood to include a seat pan, seat frame, armrests, etc. In some embodiments, the passenger seat assembly 100 further includes a bezel 108 mounted to the backrest 102, and a video monitor 110 mounted in the bezel 108. In some embodiments, the video monitor 110 is mounted in an upper recess and the tray table 104 stows in a lower recess to provide a smooth and finished look for the backrest aesthetic. In some embodiments, the latch assembly 106, or portions thereof, mount in the bezel 108.

As shown, the tray table 104 is pivotally mounted to a pair of support arms 112 that are further pivotally mountable to the seat frame, for instance to the seat spreaders. In use, when the tray table 104 is released, the tray table 104 pivots relative to the support arms 112, and the support arms 112 pivot relative to the seat frame such that the tray table 104 moves apart from the backrest 102 and toward horizontal.

Other tray table mountings are possible including, but limited to, rotationally fixed support arms and direct mounting to the backrest.

Figure 2:
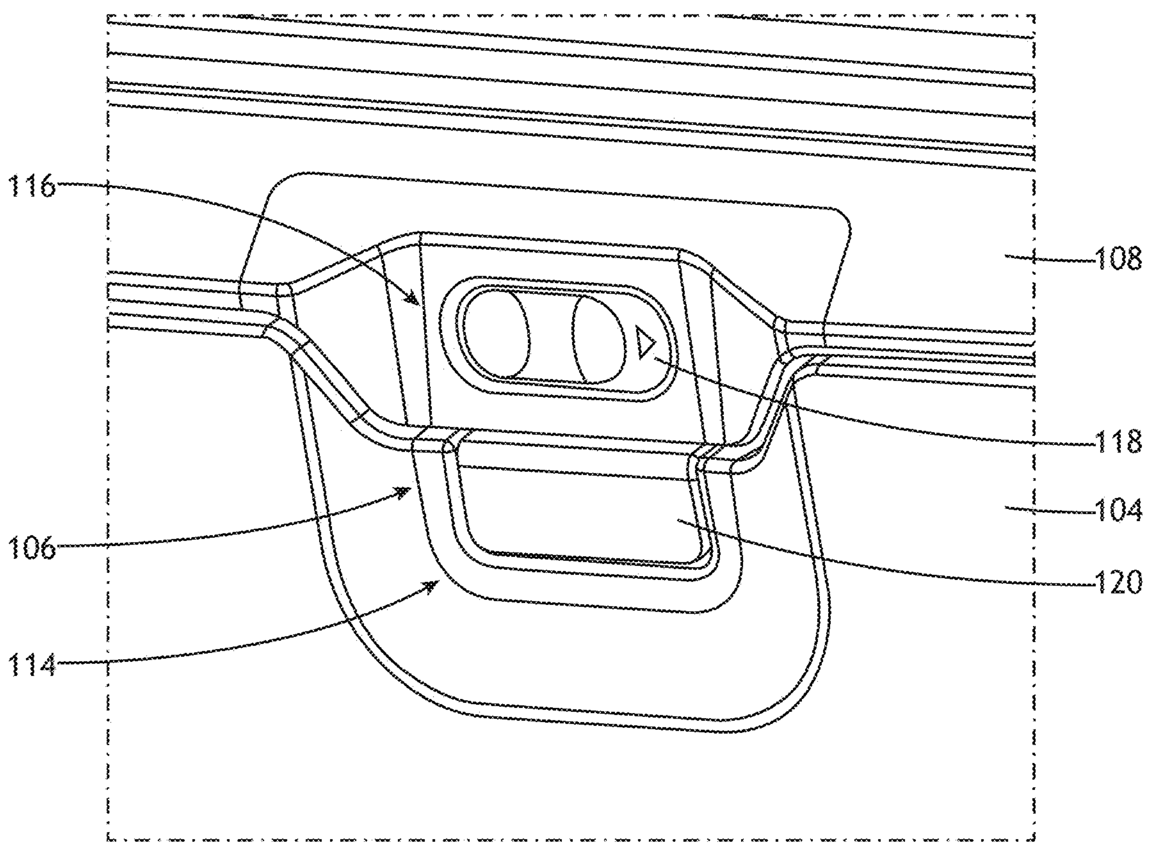
FIG. 2 is a detailed view of the passenger seat with the latch assembly shown closed, in accordance with example embodiments of this disclosure.

FIG. 2 illustrates the interface between the secured tray table 104 and the latch assembly 106. The stowed tray table 104 is retained by the latch assembly 106. In embodiments, a recess 114 may be formed in the bottom of the forward end of the tray table 104 for receiving part of the closed latch assembly 106 to minimize outward protrusion, while a further recess 116 may be formed in the bezel 108. The two recesses 114, 116 may align to form a cohesive looks and to minimize protrusion of a spring-loaded latch 118 and a spring-loaded catch 120 which are part of the latch assembly 106. In the perspective and configuration shown, the spring-loaded latch 118 slides from 'left' to 'right' to open, the spring-loaded latch 118 slides from 'right' to 'left' to close, the spring-loaded catch 120 pivots 'up' to open, and the spring-loaded catch 120 pivots 'down' to close. The spring-loaded latch 118 and/or the material surrounding the spring-loaded latch 118 may be marked with a placard, symbol, text, engraving, embossing, or the like to indicate the passenger action required to operate (e.g., open) the spring-loaded latch 118. The spring-loaded latch 118 may include a gripping surface shaped and oriented to train the passenger how to move the spring-loaded latch to open to release the caught tray table 104. Materials for each of the bezel 108, tray table 104, latch assembly 106 preferably include light weight and durable materials commonly used on aircraft, for instance durable plastics.

Figure 3:
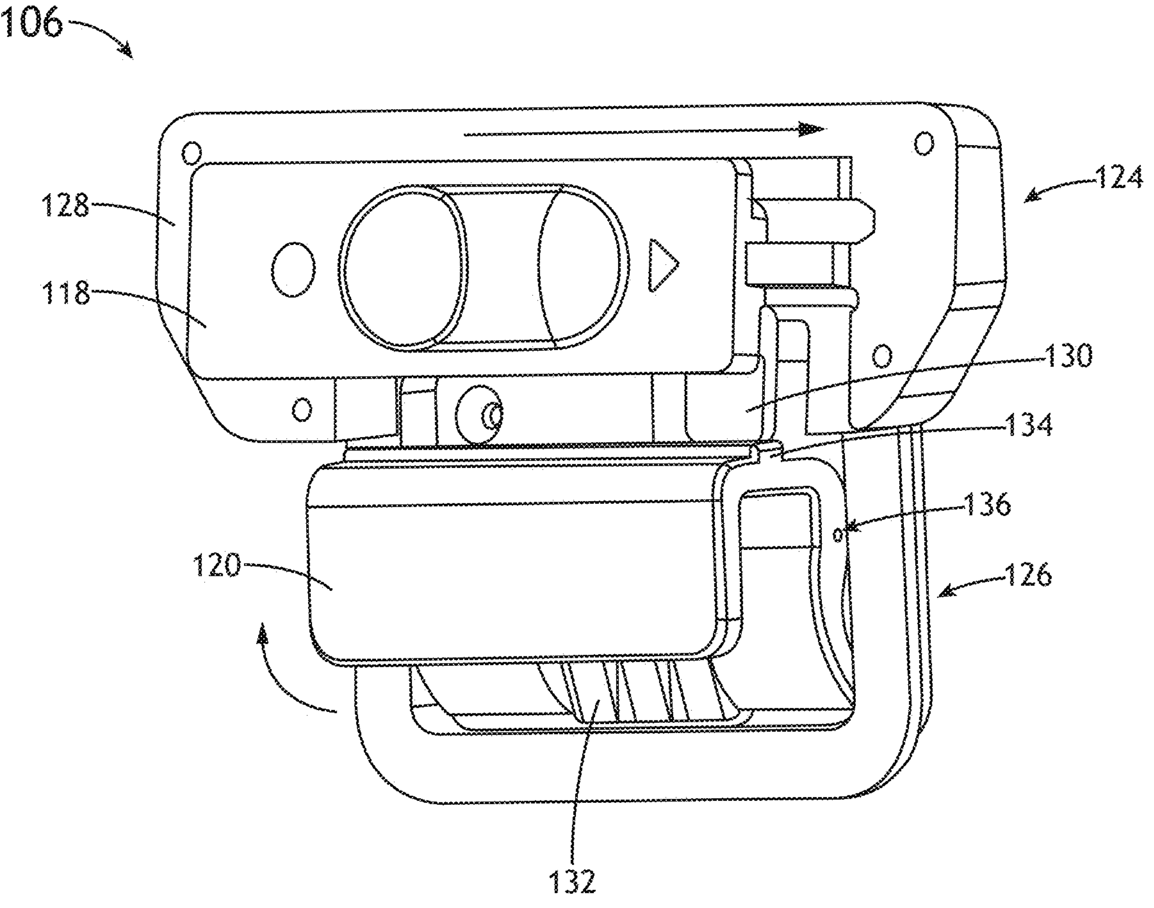
FIG. 3 is an isometric view of the latch assembly shown closed, in accordance with example embodiments of this disclosure.

FIG. 3 illustrates the latch assembly 106 shown in a closed condition for securing a passenger seat tray table (not shown) in a stowed position. The latch assembly 106 generally includes a latch subassembly 124 for interacting with a catch subassembly 126. The latch subassembly 124 generally includes a first mounting block 128, the spring-loaded latch 118 slidably mounted to the first mounting block 128, and a tab 130 mounted to the spring-loaded latch 118. By mounting the tab 130 to the spring-loaded latch 118, the tab 130 is carried along as the spring-loaded latch 118 slides back and forth horizontally between open and closed. As shown in the perspective of FIG. 3, the spring-loaded latch 118 is positioned to the 'left' which corresponds to closed. In some embodiments, the spring-loaded latch 118 and the tab 130 may be integrally formed.

The catch subassembly 126 generally includes a second mounting block 132, and the spring-loaded catch 120 pivotally mounted to the second mounting block 132. As shown in the perspective of FIG. 3, the spring-loaded catch 120 is pivoted 'down' which corresponds to closed. When each of the spring-loaded latch 118 and spring-loaded catch 120 are closed, the tab 130 engages the spring-loaded catch 120 to prevent the spring-loaded catch 120 from pivoting 'up' to open. As shown, the tab 130 is mounted to one side of the spring-loaded latch 118 and extends downward to contact a 'top' of the spring-loaded catch 120 when closed. Specifically, the tab 130 makes direct physical contact with an elongated rail 134 formed on the 'top' of the spring-loaded catch 120. As the spring-loaded latch 118 slides horizontally, the tab 130 slides along part of the rail 134. The pivot axis 136 is positioned below the tab 130 such that the spring-loaded catch 120, when engaged by the tab 130, is prevented from pivoting 'up' to open.

Figure 4:
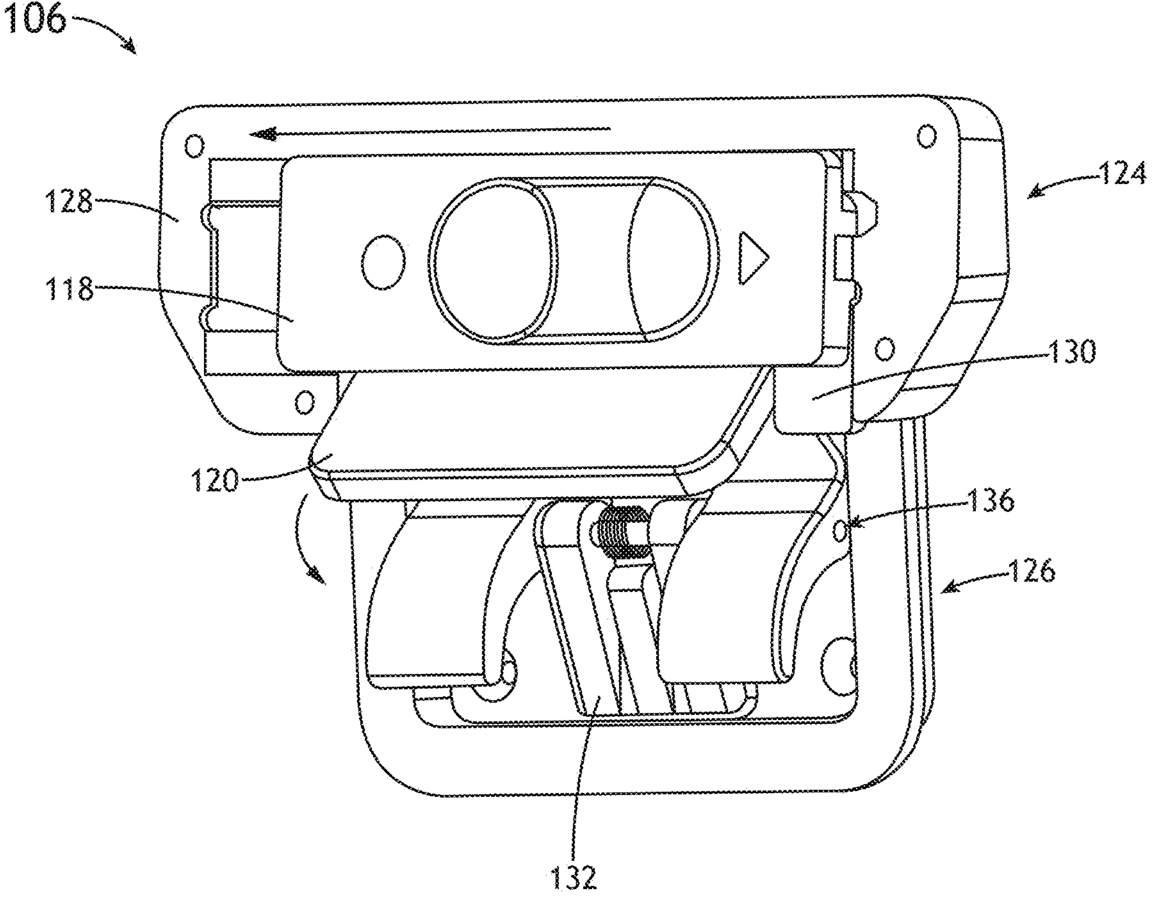
FIG. 4 is an isometric view of the latch assembly shown open, in accordance with example embodiments of this disclosure.

FIG. 4 illustrates the latch assembly 106 shown in an open condition ready to receive a stowing tray table (not shown). As shown in the perspective of FIG. 3, the spring-loaded latch 118 is positioned to the 'right' which corresponds to open. When open, the tab 130 is positioned to the side of the spring-loaded catch 120 and therefore out of contact with the top of the spring-loaded catch 120. The action of opening the spring-loaded latch 118 removes the pivoting constraint of the tab 130 which allows the spring-loaded catch 120 to pivot 'up' or open. The spring-loaded catch 120 is biased toward open such that the spring-loaded catch 120 opens automatically and remains open until closed from the action of stowing the tray table.

When the spring-loaded catch 120 is open, the tab 130 is held against the side of the spring-loaded catch 120 by way of the spring force of the spring-loaded latch 118 biasing the spring-loaded latch 118 toward closed. The spring-loaded latch 118 is preventing from sliding closed while the spring-loaded catch 120 is open because the tab is laterally constrained. Once the spring-loaded catch 120 is pivoted closed such that the spring-loaded catch 120 is clear of the tab 130, the spring-loaded latch 118 able to slide to the 'left' atop and in contact with the rail to reset the latch assembly 106 for the next opening sequence. Thus, when the latch assembly 106 is closed, the spring-loaded catch 120 is pivotally constrained and held closed, and when the spring-loaded catch 120 is open, the spring-loaded latch 118 is slidably constrained and held open. This configuration provides for auto-latching and auto-resetting for convenience of use.

Figure 5:
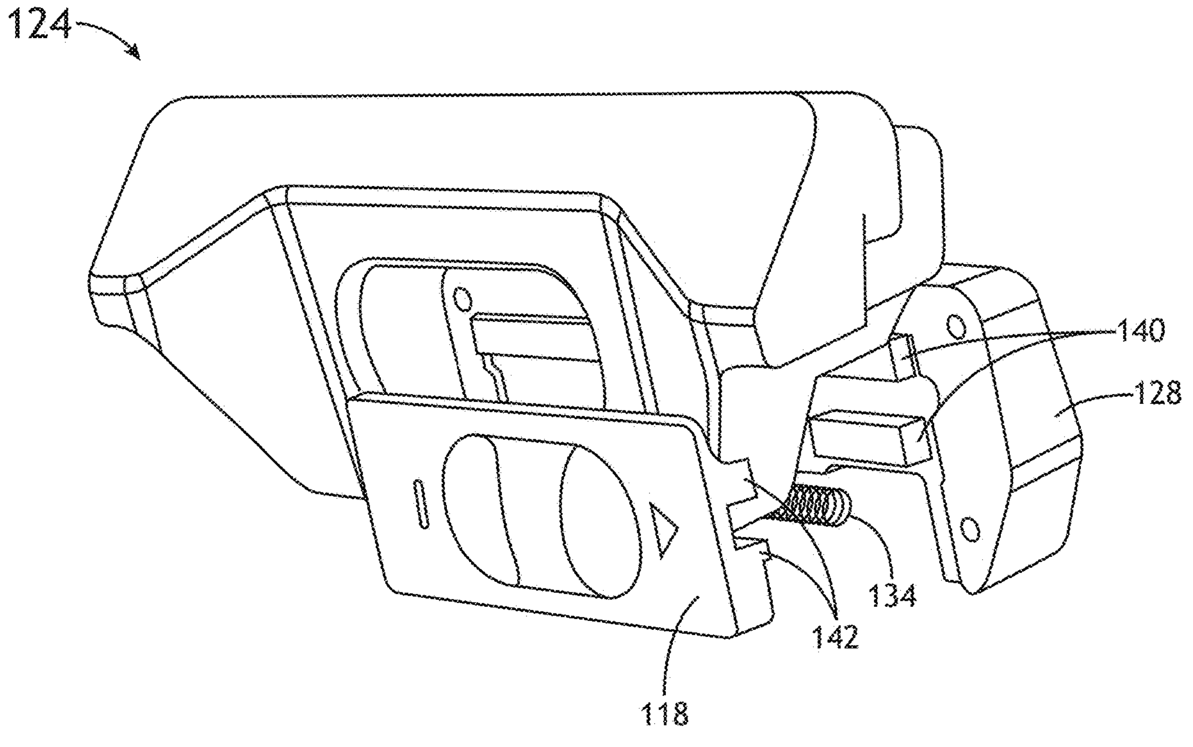
FIG. 5 is an exploded view of a latch subassembly of the latch assembly, in accordance with example embodiments of this disclosure.

FIG. 5 illustrates the components of the latch subassembly 124 including the first mounting block 128, the spring-loaded latch 118, and the tab 130. In some embodiments, the spring-loading may be provided by a tension spring 138 connected between the spring-loaded latch 118 and the first mounting block 118. In use, the action of sliding the spring-loaded latch 118 toward open elongates and energizes the tension spring 138 such that the energized tension spring 138 wants to return the spring-loaded latch 118 to the starting position which corresponds to closed. In some embodiments, the first mounting block 128 includes spaced rails 140 on the outward facing side that engage with spaced rails 142 on the inward facing side of the spring-loaded latch 118. The outward and inward sides face each other such that the rails 140, 142 engage to provide linear motion, for instance horizontal sliding motion.

Figure 6:
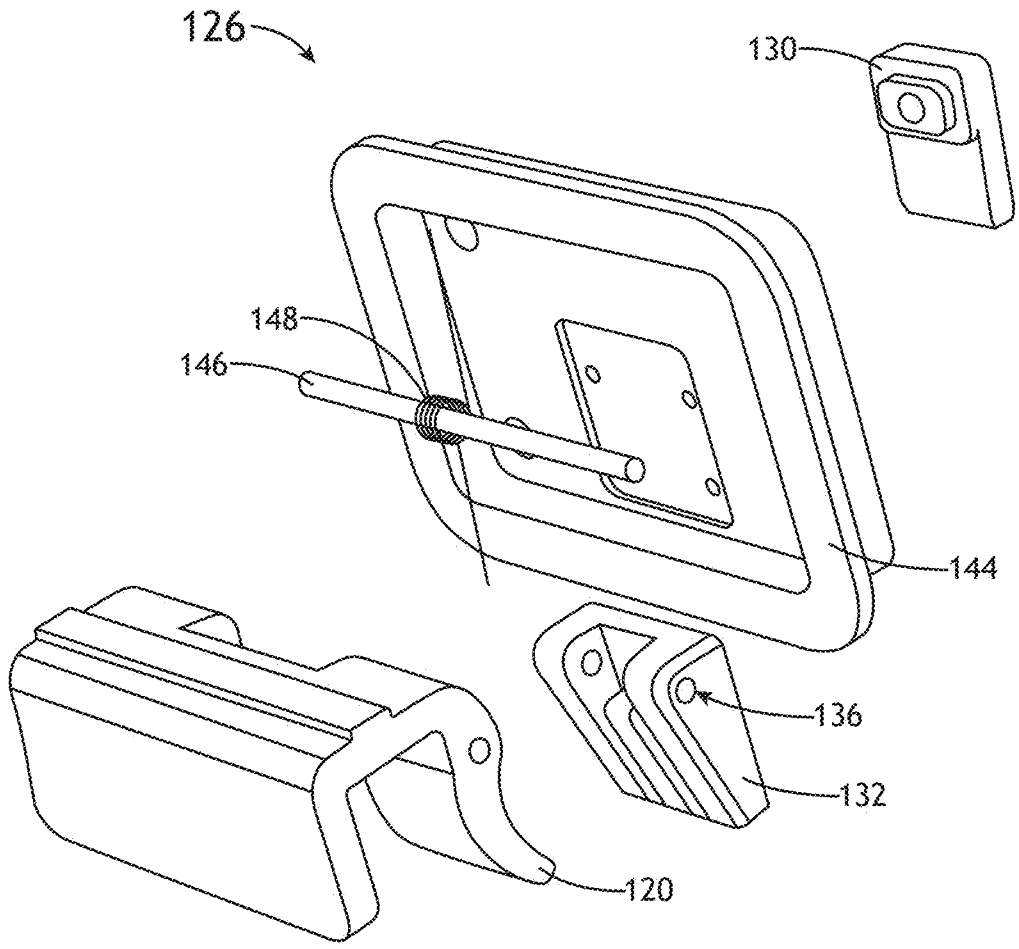
FIG. 6 is an exploded view of a catch subassembly of the latch assembly, in accordance with example embodiments of this disclosure.

FIG. 6 illustrates the components of the catch subassembly 126 including the second mounting block 132, and the spring-loaded catch 120. In embodiments, the catch subassembly 120 may further include a bezel 144 for mounting to the backrest. The bezel 144 defines an interior space and the second mounting block 132 is mounted in the interior space. The second mounting block 132 defines the pivot axis 136. A pin 146 is received through the spring-loaded catch 120 and the second mounting block 132 to pivotally attach the spring-loaded catch 120 to the second mounting block 132. The spring-loading of the spring-loaded catch 118 may be provided by a torsion spring 148 mounted on the pin 146, captured between arms of the second mounting block 132, and acting between the second mounting block 132 and the spring-loaded catch 120. In use, the closing action of the spring-loaded catch 120 winds and energizes the torsion spring 148 such that the energized torsion spring 148 wants to return the spring-loaded catch 120 to open ready to receive the stowing tray table.

Figure 7:
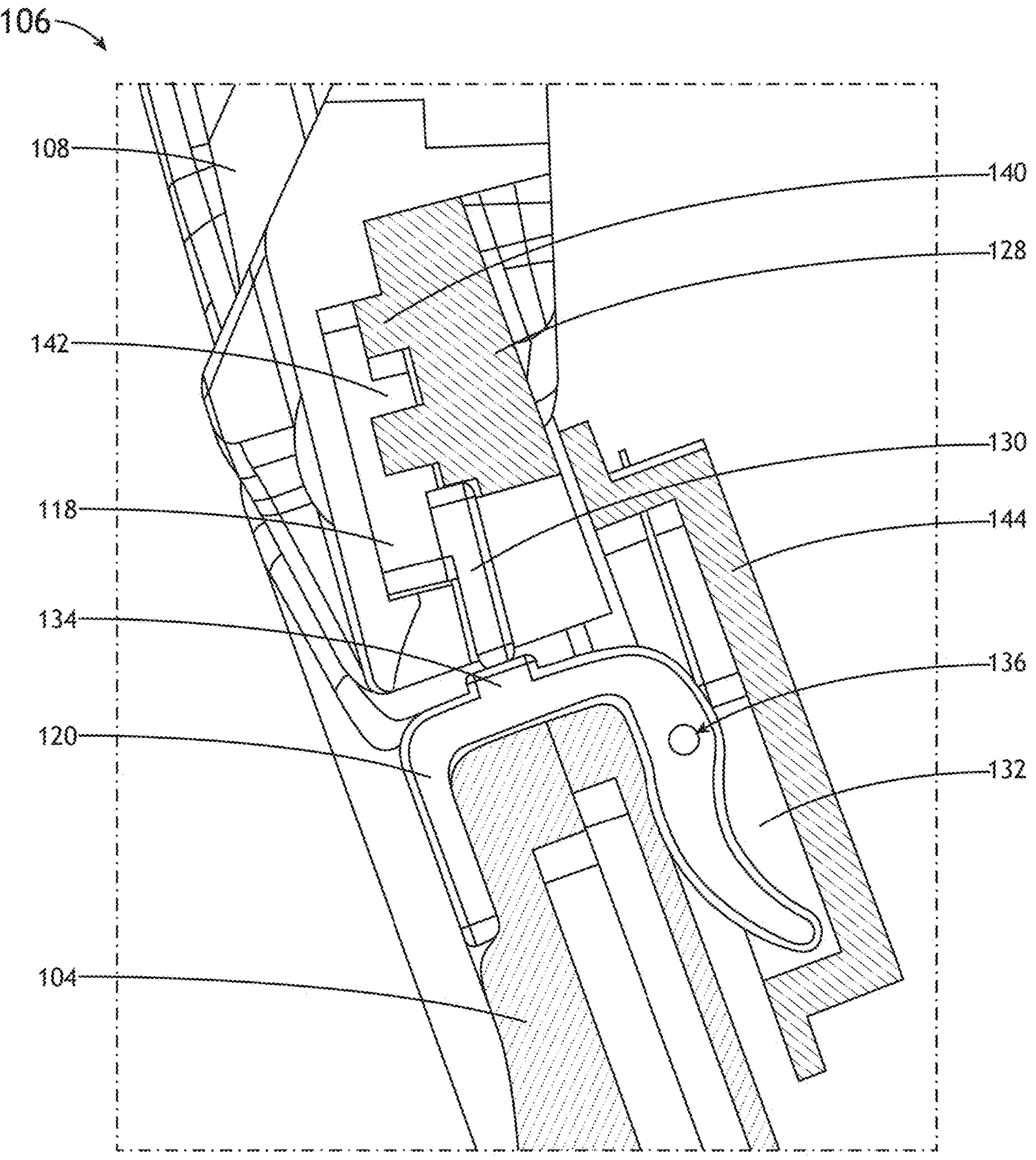
FIG. 7 is a cross sectional view of the latch assembly shown closed and retaining a tray table, in accordance with example embodiments of this disclosure.

FIG. 7 is a cross section through the latch assembly 106 shown closed to illustrate the positional relationships of the components described above. The spring-loaded catch 120 is pivoted closed to retain the tray table 104. The tray table 104 is received in the interior space formed in the spring-loaded catch 120. In embodiments, the spring-loaded catch 120 engages at least two adjacent sides of the tray table 104 (e.g., the opposing top and bottom of the tray table 104), and more preferably three adjacent sides (e.g., top, bottom, and front edge of the tray table 104). In some embodiments, the edges of the tray table 104 and catch features are radiused to guide the tray table into position fully seated in the spring-loaded catch 120. The tab 130 is shown pivotally constraining the spring-loaded catch 120 by contacting the rail 134 formed on the 'top' of the spring-loaded catch 120. The bezel 144 receives the second mounting block 132 and part of the spring-loaded catch 120 when closed.

Figure 8:
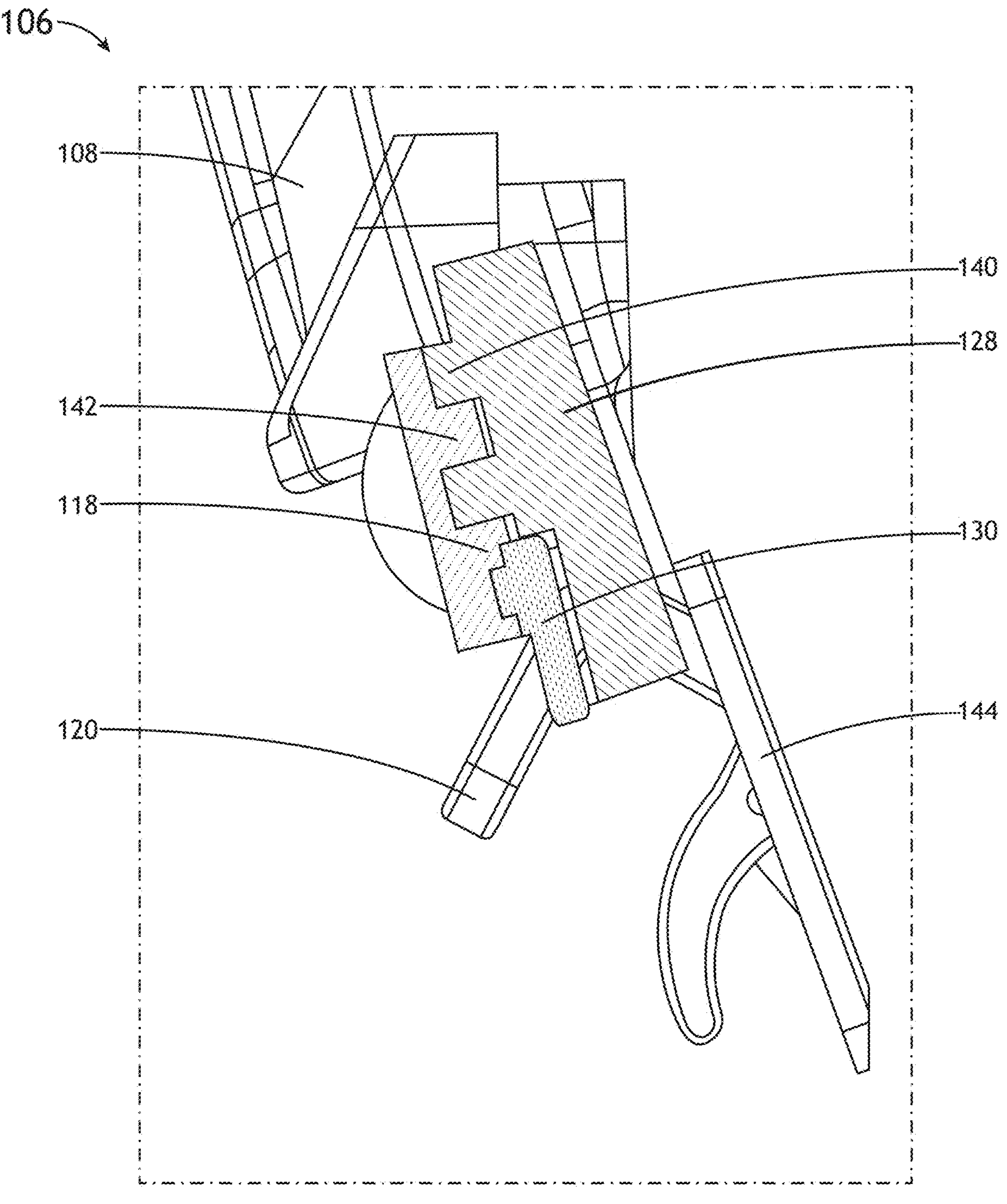
FIG. 8 is a cross sectional view of the latch assembly shown open and ready to receive a stowing tray table, in accordance with example embodiments of this disclosure.

FIG. 8 is a cross section through the latch assembly 106 shown open to illustrate the positional relationships of the components described above. The spring-loaded catch 120 is pivoted open and the tray table (not shown) is released to permit deployment. The tab 130 is shown positioned to one side of the spring-loaded catch 120 thereby allowing the spring-loaded catch 120 to pivot open.

From the above description, it is clear that the inventive concepts disclosed herein are well adapted to achieve the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A latch assembly for securing a passenger seat tray table, comprising:
- a latch subassembly, including:
  - a first mounting block configured to be mounted to a seat backrest;
  - a spring-loaded latch slidably mounted to the first mounting block; and
  - a tab mounted to the spring-loaded latch; and
- a catch subassembly, including:
  - a second mounting block configured to be mounted to the seat backrest; and
  - a spring-loaded catch pivotally mounted to the second mounting block;
- wherein the spring-loaded latch interacts with the spring-loaded catch such that, when the spring-loaded latch is closed, the tab engages the spring-loaded catch to prevent the spring-loaded catch from pivoting open; and
- wherein the spring-loaded catch interacts with the spring-loaded latch such that, when the spring-loaded catch is open, the tab engages the spring-loaded catch to prevent the spring-loaded latch from sliding closed.

2. The latch assembly according to claim 1, wherein:
- the tab engages a top of the spring-loaded catch to prevent the spring-loaded catch from rotating open; and
- the tab engages a side of the spring-loaded catch to prevent the spring-loaded latch from sliding closed.

3. The latch assembly according to claim 1, wherein the spring-loaded latch is configured to slide horizontally and the spring-loaded catch is configured to pivot about a horizontal axis.

4. The latch assembly according to claim 1, wherein the catch subassembly further comprises a bezel configured to be mounted to the seat backrest, and the second mounting block is mounted in the bezel.

5. The latch assembly according to claim 1, wherein:
- the latch subassembly further includes a tension spring for biasing the spring-loaded latch toward closed; and
- the catch subassembly further includes a torsion spring for biasing the spring-loaded catch toward open.

6. The latch assembly according to claim 1, wherein the spring-loaded catch defines an interior space configured to receive and engage a tray table on at least two sides of the tray table.

7. The latch assembly according to claim 1, wherein the first mounting block and the second mounting block are attached to each other or are integrally formed.

8. A tray table assembly for a passenger seat, comprising:
- a tray table mountable to the passenger seat; and
- a latch assembly mountable to the passenger seat for securing the tray table in a stowed position, the latch assembly comprising:
- a latch subassembly, including:
  - a first mounting block configured to be mounted to a seat backrest;
  - a spring-loaded latch slidably mounted to the first mounting block; and
  - a tab mounted to the spring-loaded latch; and
- a catch subassembly, including:
  - a second mounting block configured to be mounted to the seat backrest; and
  - a spring-loaded catch pivotally mounted to the second mounting block;
- wherein the spring-loaded latch interacts with the spring-loaded catch such that, when the tray table is stowed and the spring-loaded latch is closed, the tab engages the spring-loaded catch to prevent the spring-loaded catch from pivoting open; and
- wherein the spring-loaded catch interacts with the spring-loaded latch such that, when the tray table is deployed and the spring-loaded catch is open, the tab engages the spring-loaded catch to prevent the spring-loaded latch from sliding closed.

9. The tray table assembly according to claim 8, wherein:
- the tab engages a top of the spring-loaded catch to prevent the spring-loaded catch from rotating open; and
- the tab engages a side of the spring-loaded catch to prevent the spring-loaded latch from sliding closed.

10. The tray table assembly according to claim 8, wherein the spring-loaded latch is configured to slide horizontally and the spring-loaded catch is configured to pivot about a horizontal axis.

11. The tray table assembly according to claim 8, wherein the catch subassembly further comprises a bezel configured to be mounted to the seat backrest, and the second mounting block is mounted in the bezel.

12. The tray table assembly according to claim 8, wherein:
- the latch subassembly further includes a tension spring for biasing the spring-loaded latch toward closed; and
- the catch subassembly further includes a torsion spring for biasing the spring-loaded catch toward open.

13. The tray table assembly according to claim 8, wherein the spring-loaded catch defines an interior space configured to receive and engage the tray table on at least two sides of the tray table.

14. The tray table assembly according to claim 8, wherein:
- sliding the spring-loaded latch open causes, in sequential order, the tab to disengage the spring-loaded catch, the spring-loaded catch to pivot open, and the tray table to release from the catch; and
- stowing the tray table causes, in sequential order, the tray table to engage in the spring-loaded catch, the spring-loaded catch to rotate closed, and the spring-loaded latch to rotate closed and into engagement with the spring-loaded catch.

15. An aircraft passenger seat assembly, comprising:

a passenger seat including a backrest;

a tray table moveable between a stowed position against a back of the backrest and a deployed position apart from the back of the backrest; and a latch assembly mounted to the back of the backrest above the tray table, the latch assembly comprising:

a latch subassembly, including:

a first mounting block mounted to the backrest;

a spring-loaded latch slidably mounted to the first mounting block; and a tab mounted to the spring-loaded latch; and a catch subassembly, including:

a second mounting block mounted to the backrest; and a spring-loaded catch pivotally mounted to the second mounting block;

wherein the spring-loaded latch interacts with the spring-loaded catch such that, when the tray table is stowed and the spring-loaded latch is closed, the tab engages the spring-loaded catch to prevent the spring-loaded catch from pivoting open; and wherein the spring-loaded catch interacts with the spring-loaded latch such that, when the tray table is deployed and the spring-loaded catch is open, the tab engages the spring-loaded catch to prevent the spring-loaded latch from sliding closed.

16. The aircraft passenger seat assembly according to claim 15, wherein:

the tab engages a top of the spring-loaded catch to prevent the spring-loaded catch from rotating open; and the tab engages a side of the spring-loaded catch to prevent the spring-loaded latch from sliding closed.

17. The aircraft passenger seat assembly according to claim 15, wherein the spring-loaded latch is configured to slide horizontally and the spring-loaded catch is configured to pivot about a horizontal axis.

18. The aircraft passenger seat assembly according to claim 15, wherein the spring-loaded catch defines an interior space configured to receive and engage the tray table on at least two sides of the tray table.

19. The aircraft passenger seat assembly according to claim 15, wherein an exterior profile of a captured edge of the tray table matches an interior profile of the spring-loaded catch.

20. The aircraft passenger seat assembly according to claim 15, wherein:

sliding the spring-loaded latch open causes, in sequential order, the tab to disengage the spring-loaded catch, the spring-loaded catch to pivot open, and the tray table to release from the catch; and stowing the tray table causes, in sequential order, the tray table to engage in the spring-loaded catch, the spring-loaded catch to rotate closed, and the spring-loaded latch to rotate closed and into engagement with the spring-loaded catch.

* * * * *